(12) United States Patent
Kumar et al.

(10) Patent No.: US 9,212,537 B2
(45) Date of Patent: Dec. 15, 2015

(54) COATINGS FOR WELLBORE TOOLS, COMPONENTS HAVING SUCH COATINGS, AND RELATED METHODS

(75) Inventors: Sunil Kumar, Celle (DE); Hendrik John, Celle (DE); Michael R. Wells, The Woodlands, TX (US); Anthony A. DiGiovanni, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 1030 days.

(21) Appl. No.: 13/168,608

(22) Filed: Jun. 24, 2011

(65) Prior Publication Data

US 2012/0325497 A1  Dec. 27, 2012

(51) Int. Cl.
| | |
|---|---|
| E21B 23/00 | (2006.01) |
| C09D 7/00 | (2006.01) |
| E21B 41/00 | (2006.01) |
| C09D 163/00 | (2006.01) |

(52) U.S. Cl.
CPC ............ *E21B 41/00* (2013.01); *C09D 163/00* (2013.01); *Y10T 428/31511* (2015.04)

(58) Field of Classification Search
CPC ........................................................ C09D 7/00
USPC ............................................ 166/277; 175/57
See application file for complete search history.

(56) References Cited

U.S. PATENT DOCUMENTS

| | | | |
|---|---|---|---|
| 3,024,153 A * | 3/1962 | Kennedy | 156/187 |
| 3,120,460 A * | 2/1964 | Schell et al. | 156/187 |
| 3,740,291 A * | 6/1973 | Mallard | 156/392 |
| 4,415,613 A * | 11/1983 | Medney | 428/34.5 |
| 4,600,062 A * | 7/1986 | Teng | 175/322 |
| 5,437,342 A * | 8/1995 | Powada | 175/325.5 |
| 5,660,624 A * | 8/1997 | Dry | 106/677 |
| 6,075,072 A * | 6/2000 | Guilbert et al. | 523/200 |
| 6,420,052 B1 | 7/2002 | Keeney et al. | |
| 7,134,491 B2 * | 11/2006 | Kohli et al. | 166/250.08 |
| 7,612,152 B2 | 11/2009 | Braun et al. | |
| 7,631,697 B2 * | 12/2009 | Bhavsar | 166/381 |
| 2002/0023745 A1 | 2/2002 | George et al. | |
| 2008/0135296 A1 * | 6/2008 | Kipp et al. | 175/57 |

(Continued)

OTHER PUBLICATIONS

International Preliminary Report on Patentability for International Application No. PCT/US2012/042082 dated Dec. 24, 2013, 8 pages.

(Continued)

*Primary Examiner* — Angela M DiTrani
*Assistant Examiner* — Avi Skaist
(74) *Attorney, Agent, or Firm* — TraskBritt (57) ABSTRACT

A component of a wellbore tool comprises a plurality of compartments disposed over a body of the component and a coating disposed over at least a portion of a surface of the body. Each compartment comprises a healing agent formulated to form or catalyze the formation of a barrier upon release from the compartment. A matrix material separates the plurality of compartments. Methods of forming wellbore tools include forming a body, forming a plurality of capsules, and forming a coating comprising the capsules over the body. Methods of utilizing a wellbore tool in a subterranean borehole include contacting at least a portion of a body with a fluid comprising a healing agent formulated to a barrier. Coatings for wellbore tools include a fiber comprising a plurality of discrete cells and a matrix material contacting and at least partially surrounding the fiber. Each cell comprises a healing agent.

23 Claims, 6 Drawing Sheets

(56) References Cited

U.S. PATENT DOCUMENTS

2011/0003159 A1 1/2011 Mather et al.
2011/0111207 A1 5/2011 Doye et al.
2012/0100366 A1 4/2012 Dumm et al.

OTHER PUBLICATIONS

Cho et al., Self-Healing Polymer Coatings, Advanced Materials, vol. 21, pp. 645-649 (2009).
Etzold et al., The Use of Corrosion Inhibitors in Steel Strip Production and Coating, www.surtec.com/publikationen/inhibitors steelstrip.pdf, 14 pages.
Micro Nano Encapsulation, Southwest Research Institute, San Antonio, TX, http://www.swri.org/4org/d01/microenc/micro/atomization.htm, 12 pages.
Park et al., Coaxial Electrospinning of Self-Healing Coatings, Advanced Materials, vol. 21, pp. 1-4 (2010).
Shchukin et al., Self-Repairing Coatings Containing Active Nanoreservoirs, Small 2008, vol. 3, No. 6, pp. 926-943.
The Economist, Metal, Heal Thyself, http://www.economist.com/node/16295654/print, Jun. 10, 2010, 2 pages.
White et al., Autonomic healing of polymer composites, Nature, vol. 409, pp. 794-797 (2001).
International Search Report for International Application No. PCT/US2012/042082 dated Feb. 28, 2013, 3 pages.
International Written Opinion for International Application No. PCT/US2012/042082 dated Feb. 28, 2013, 6 pages.

\* cited by examiner

COATINGS FOR WELLBORE TOOLS, COMPONENTS HAVING SUCH COATINGS, AND RELATED METHODS

FIELD

Embodiments of the present disclosure relate to coatings for tools and components thereof used within wellbores, and to methods of forming coatings and using tools having such coatings.

BACKGROUND

Wellbores are formed in subterranean formations for various purposes including, for example, extraction of oil and gas from the subterranean formation and extraction of geothermal heat from the subterranean formation. Wellbores may be formed in a subterranean formation using a drill bit such as, for example, an earth-boring rotary drill bit. Different types of earth-boring rotary drill bits are known in the art including, for example, fixed-cutter bits (which are often referred to in the art as "drag" bits), rolling-cutter bits (which are often referred to in the art as "rock" bits), diamond-impregnated bits, and hybrid bits (which may include, for example, both fixed cutters and rolling cutters). The drill bit is rotated and advanced into the subterranean formation. As the drill bit rotates, the cutters or abrasive structures thereof cut, crush, shear, and/or abrade away the formation material to form the wellbore. A diameter of the wellbore drilled by the drill bit may be defined by the cutting structures disposed at the largest outer diameter of the drill bit.

The drill bit is coupled, either directly or indirectly, to an end of what is referred to in the art as a "drill string," which comprises a series of elongated tubular segments connected end-to-end that extends into the wellbore from the surface of the formation. Various tools and components, including the drill bit, may be coupled together at the distal end of the drill string at the bottom of the wellbore being drilled. This assembly of tools and components is referred to in the art as a "bottom hole assembly" (BHA).

The drill bit may be rotated within the wellbore by rotating the drill string from the surface of the formation, or the drill bit may be rotated by coupling the drill bit to a downhole motor, which is also coupled to the drill string and disposed proximate the bottom of the wellbore. The downhole motor may comprise, for example, a hydraulic Moineau-type motor having a shaft, to which the drill bit is mounted, that may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore. The downhole motor may be operated in conjunction with drill string rotation, or without rotation, as is conventional.

A drill string may include a number of components in addition to a downhole motor and drill bit including, without limitation, drill pipe, drill collars, stabilizers, measuring while drilling (MWD) equipment, logging while drilling (LWD) equipment, downhole communication modules, and other components.

In addition to drill strings, other tool strings may be disposed in an existing well bore for, among other operations, completing, testing, stimulating, producing, and remediating hydrocarbon-bearing formations.

When drilling, completing, testing, stimulating, producing or remediating a wellbore, surfaces of drill string and tool string components may become damaged. For example, protective coatings over surfaces may become scratched, exposing metal underneath. Damage may occur on interior and/or exterior surfaces of such components. Such damage may lead to corrosion and premature failure of such components and to additional costs associated with removal and repair or replacement of damaged components.

BRIEF SUMMARY

In some embodiments, the present disclosure includes a component of a wellbore tool comprising a body, a plurality of compartments disposed over a surface of the body, and a coating disposed over at least a portion of the body. Each compartment may comprise a healing agent formulated to form or catalyze the formation of a barrier over an adjacent portion of the wellbore tool upon release from the compartment. The coating may comprise a matrix material and separates the plurality of compartments from one another.

A method of forming a wellbore tool may include forming a body, forming a plurality of capsules, and forming a coating comprising the capsules over at least a portion of a surface of the body. Each capsule may comprise a healing agent formulated to form a barrier over the wellbore tool upon release from the capsule. The coating may comprise a matrix material configured to maintain separation between each of the plurality of capsules.

A method of utilizing a wellbore tool in a subterranean formation may include disposing a wellbore tool in a borehole. The wellbore tool may comprise a body and a coating over at least a portion of the body, the coating comprising a matrix material and a plurality of capsules, each capsule comprising a first healing agent. The method may further include contacting at least a portion of the body with a fluid comprising a second healing agent formulated to form a barrier over at least a portion of the wellbore tool upon contact with the first healing agent.

A coating for a wellbore tool may include a fiber comprising a plurality of discrete cells and a matrix material contacting and at least partially surrounding the fiber. Each cell may comprise a healing agent and may be formulated to form a barrier upon release from the fiber.

BRIEF DESCRIPTION OF THE DRAWINGS

While the specification concludes with claims particularly pointing out and distinctly claiming what are regarded as embodiments of the disclosure, various features and advantages of this disclosure may be more readily ascertained from the following description of example embodiments provided with reference to the accompanying drawings, in which:

DETAILED DESCRIPTION

The illustrations presented herein are not actual views of any particular wellbore tool, drill bit, or component of such a tool or bit, but are merely idealized representations that are employed to describe embodiments of the present disclosure.

As used herein, the term "wellbore tool" means and includes any component used within, or to form, a wellbore in a subterranean formation. Wellbore tools include—without limitation—earth-boring tools, drill collars, drill pipe, stabilizers, downhole motors, sensor (MWD and/or LWD) modules, communications subs, pumps, exit tools, reamers, packers, bridge plugs, testing tools, logging tools, etc.

Figure 1:
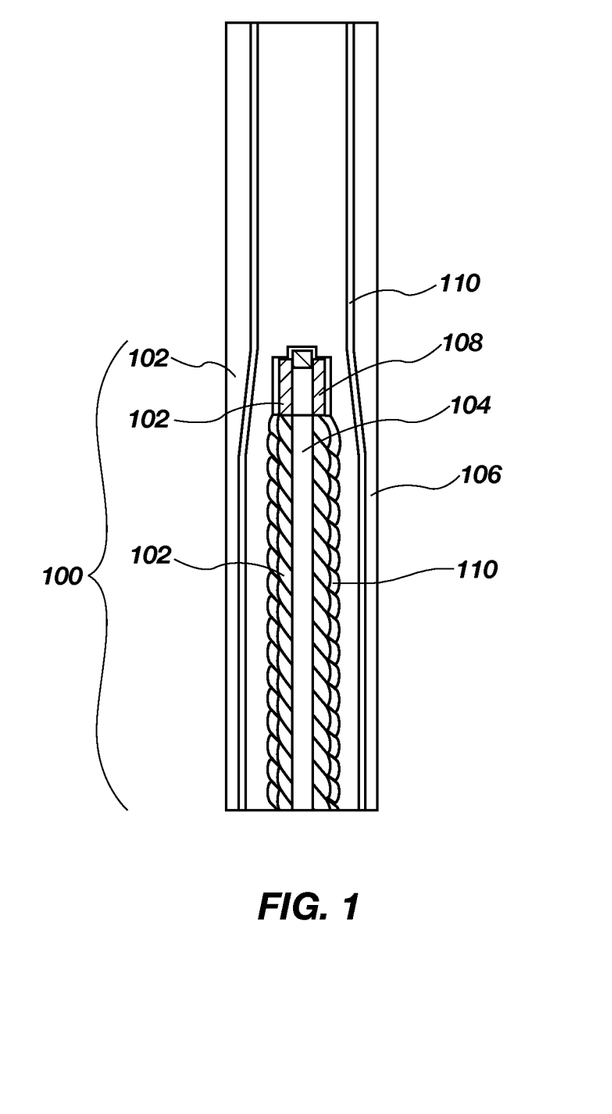
FIG. 1 is a cross-sectional view of an embodiment of a component of a wellbore tool of the present invention comprising a portion of a downhole motor that includes a coating.

The current disclosure includes a component of a wellbore tool having a coating configured to heal itself when damaged (i.e., a self-healing coating). For example, as shown in FIG. 1, a component of a wellbore tool configured as a downhole Moineau-type "mud" motor may include a portion of a power section 100 of a downhole motor. The component of a wellbore tool includes one or more bodies 102, such as a rotor 104, a stator 106, or a bypass valve assembly 108. The body 102 may include any metal, alloy or other hard material. One or more surfaces of the bodies 102, for example, rotor 104 and bypass valve assembly 108, may have coatings 110 over at least a portion thereof.

Figure 2:
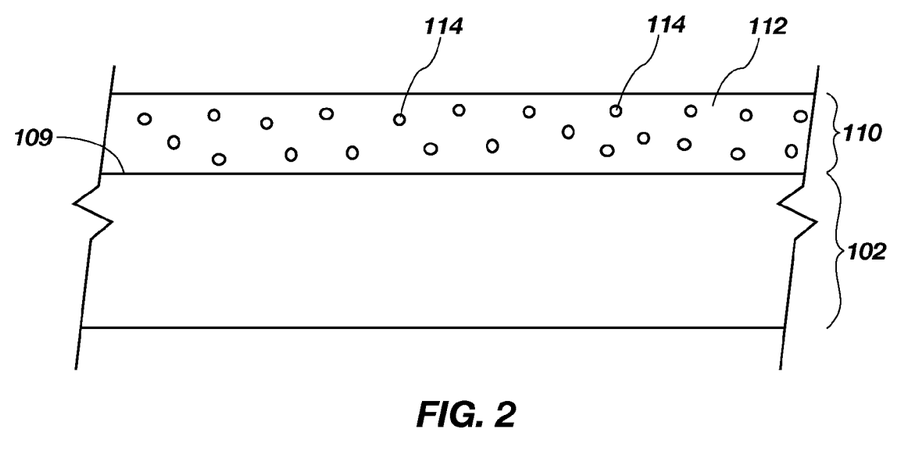
FIG. 2 is a cross-sectional view of an embodiment of a component of a wellbore tool including a coating.

As shown in FIG. 2, a coating 110 may be formed over a surface 109 of a body 102. The structure of the coating 110 is described below, and methods that may be used to fabricate the coating 110 are subsequently described herein. The coating 110 may include a matrix material 112. The matrix material 112 may be a protective coating as known in the art for improving a property of a substrate, such as corrosion resistance or coefficient of friction. The matrix material 112 may include a polymer, an epoxy, a metal, a ceramic, a composite material, etc. For example, the matrix material 112 may be an epoxy vinyl ester resin. In some embodiments, the matrix material 112 may comprise an epoxy material formed from a mixture of bisphenol A diglycidyl ether and diethylenetriamine.

A plurality of compartments 114 may reside within the matrix material 112. For example, the plurality of compartments 114 may be configured as spheres, capsules, fibers, platelets, rods, irregular objects, etc. As used herein, the term "compartment" means and includes not only structures including a volume surrounded by a containing wall, but structures otherwise configured to contain another, flowable material. The plurality of compartments 114 may each have a dimension (e.g., a diameter or length) of about 50 microns or less, about 1 micron or less, or even about 100 nm or less, or a combination of compartments 114 of differing sizes may be used. In some embodiments, even larger compartments 114 may be used, such compartments 114 having dimensions, for example, from 100 microns to 1 mm. Furthermore, compartments 114 may have one dimension (e.g., a length) much larger than another dimension (e.g., a diameter). Fibers, for example, may have lengths exceeding 1 mm (e.g., 10 cm) and diameters of less than 100 microns. The compartments 114 may be configured as microbubbles (i.e., approximately spherical containers having a diameter of less than about 1 mm) or as nanobubbles (i.e., approximately spherical containers having a diameter of less than about 1 micron). The plurality of compartments 114 may be small enough that their presence does not significantly diminish a selected mechanical property of the matrix material 112 (e.g., stiffness, resistance to tearing, etc.). For example, the plurality of compartments 114 may have a dimension of about 20% or less of a thickness of the matrix material 112, about 10% or less of a thickness of the matrix material 112, about 5% or less of a thickness of the matrix material 112, or about 1% or less of a thickness of the matrix material 112. The plurality of compartments 114 may be arranged in an ordered pattern throughout the coating 110, or may have a random arrangement.

The plurality of compartments 114 may contain one or more healing agents. For example, the compartments 114 may each encapsulate a liquid or other flowable (e.g., gel) healing agent. As used herein, the term "healing agent" means any material that is formulated, upon release from one of the plurality of compartments 114, to or catalyze the formation of a barrier over at least a portion of the body 102. As used herein, the term "barrier" means and includes a barrier, which may be continuous or discontinuous, conformal or non-conformal, over a surface of a material of a wellbore tool or component, which enhances a characteristic exhibited by the surface. For example, a surface may be passivated by the barrier to reduce reactivity with a surrounding environment, such as a drilling or treatment fluid. In another embodiment, the barrier may be a solid material that enhances at least one of erosion, abrasion, and impact resistance of the surface. In a further embodiment, the barrier may reduce a coefficient of friction of the surface.

The healing agent may comprise a passivating material, meaning that contact therewith may reduce the reactivity of an exposed surface of a material or react with the surface to form a passivating layer with a reduced tendency to react with a surrounding environment. Materials such as chromates may be used as passivating agents to retard corrosion, but may have health, safety, and/or environmental risks. To reduce such risks, the healing agent may be selected to include alternative materials, such as a monomer, a prepolymer, an epoxy, or any other compound that may react to form a solid barrier. For example, healing agents may include dicyclopentadiene, as described with respect to bulk polymer composites in S. R. White et al., *Autonomic healing of polymer composites*, 409 NATURE 794 (2001), the disclosure of which is incorporated herein in its entirety by this reference. As another example, healing agents may include hydroxyl end-functionalized polydimethylsiloxane or polydiethoxysiloxane, as described in Soo Hyoun Cho, et al., *Self-Healing Polymer Coatings*, 21 ADVANCED MATERIALS 645 (2009), the disclosure of which is incorporated herein in its entirety by this reference. Healing agents such as siloxane prepolymers and polysiloxanes are described in "Self-Healing Polymers," U.S. Pat. No. 7,612,152, issued Nov. 3, 2009, the disclosure of which is incorporated herein in its entirety by this reference.

Healing agents may be formulated to interact with the matrix material 112 or the body 102 upon release from compartments 114. In some embodiments, healing agents may include an inhibitor that forms a layer over the matrix material 112 and/or the body 102 to reduce corrosion. For example, inhibitors may include an organic inhibitor, such as an alkene or an amine. In other embodiments, the healing agent may be formulated to reduce the concentration of corrosive agents in a wellbore, such as by acting as a scavenger or sacrificial materials. Thus, the healing agent released from a compartment 114 may affect the body 102 and/or the coating 110 on the surface, or its effects may extend to other portions of the wellbore tool (e.g., nearby portions of the tool).

In some embodiments, the healing agent may promote self-passivation of the body 102. For example, if the body 102 includes steel, phosphoric acid may be used as a healing agent. Phosphoric acid may form a phosphate, which may, in turn, protect the steel from corrosive environments.

Figure 3:
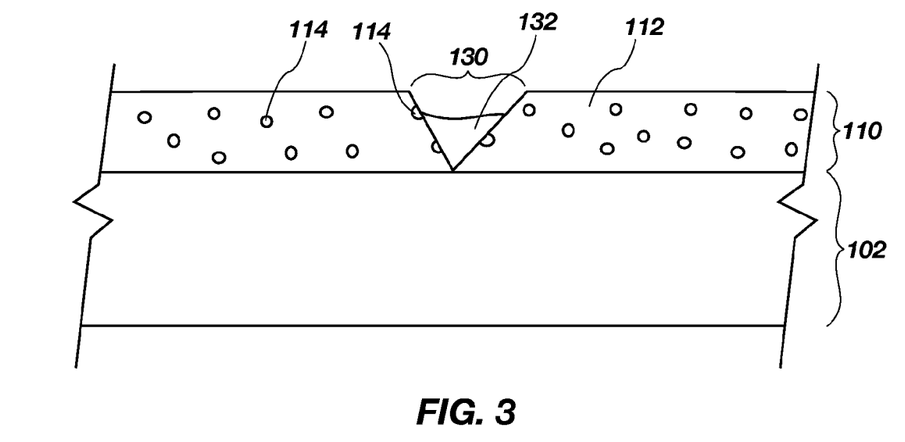
FIG. 3 is a cross-sectional view of the component shown in FIG. 2 after it has been damaged.

As shown in FIG. 3, the coating 110 over the body 102 may be damaged during use, such as within a wellbore. A portion of the coating 110 and/or the body 102 may be removed in an area of damage 130 to coating 110, such as by corrosion, abrasion, erosion, nicks, cuts, scratches, gouges, etc. One or more of the compartments 114 of the coating 110 may be breached, broken or otherwise compromised, releasing a healing agent. The healing agent may react in the presence of brine or organic material to form a barrier 132 over a portion of the body 102 and/or a portion of the coating 110. In other words, the barrier 132 may be a product of a chemical reaction in which the healing agent is a reactant. The barrier 132 may include a lubricant, an inhibitor, or both. For example, the barrier 132 may limit the degradation of one or more properties of the body 102 near the area of damage 130. In some embodiments, the barrier 132 may diminish a rate of or halt, corrosion of a portion of the body 102 unprotected due to damage of coating 110. The barrier 132 may exhibit improved friction properties with respect to a damaged area of the body 102 not coated with a barrier 132. The barrier 132 may electrically insulate the damaged area. The barrier 132 may be a reformation of the matrix material 112, sealing any breaches therethrough and again protecting the body 102, despite the damage. One or more healing agents may comprise a catalyst for stimulating or accelerating beneficial activity of another healing agent. For example, a catalyst may be formulated to increase a rate at which another healing agent forms a barrier. In some embodiments, a healing agent may not react, or may react slowly, absent contact with a catalyst. The catalyst may change the temperature-dependence of the reaction rate of the healing agent. The catalyst may be physically separated from one or more other healing agents under normal conditions (i.e., when the coating 110 is undamaged). For example, the catalyst may be disposed within the matrix material 112, or may be disposed within some, but not others, of the plurality of compartments 114. When the coating 110 becomes damaged, the catalyst and/or another healing agent may be released, and may then react upon mutual contact to form a barrier. In some embodiments, a catalyst may be a part of a fluid in contact with the coating 110. The catalyst may comprise an organic material (e.g., an amine or an amine salt), a transition metal, a transition metal salt, an organometallic compound, or any other catalyst known in the art. For example, the catalyst may include dibutyltin dilaurate, dimethyldineodecanoate tin, n-hexylamine, or Grubbs' catalysts.

Figure 4:
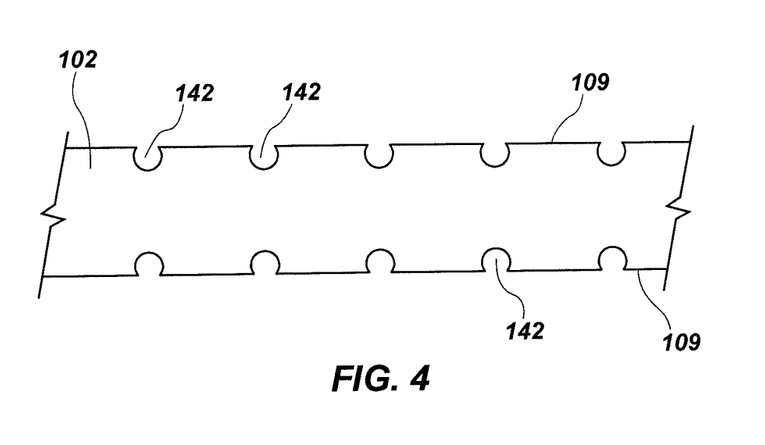
FIGS. 4 through 6 are cross-sectional views of another embodiment of a component of a wellbore tool including a coating.
Figure 5:
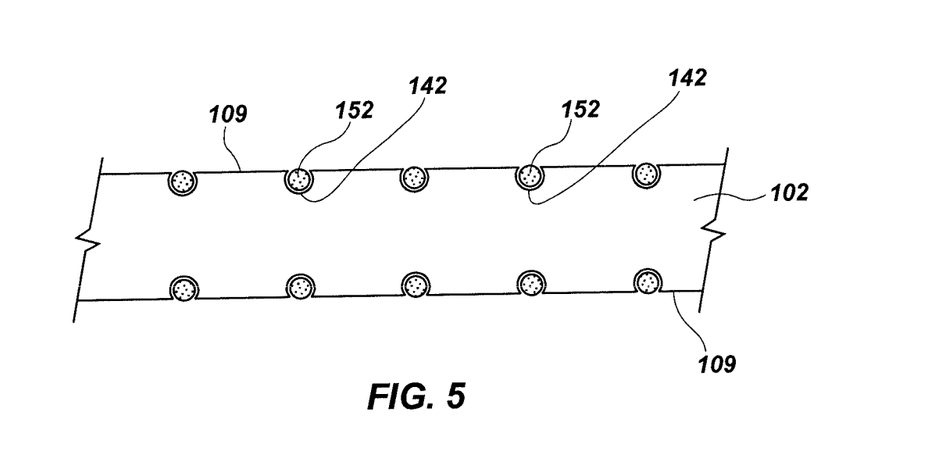

In the embodiments described above with reference to FIGS. 2 and 3, the plurality of compartments 114 are disposed in the matrix material 112. In additional embodiments, the compartments 114 may be disposed in the body 102 at or proximate the surface of the body 102 on which the matrix material 112 is disposed. For example, in some embodiments, as shown in FIG. 4, a plurality of compartments 142 (e.g., cavities) may be formed as cavities in a surface 109 of a body 102. The plurality of compartments 142 may be generally spherical, generally cylindrical, generally prismatic, or any other shape. The plurality of compartments 142 may each have a dimension (e.g., a diameter or width) of about 50 microns or less, about 1 micron or less, or even about 100 nm or less. As shown in FIG. 5, a healing agent 152 may be disposed within each of the plurality of compartments 142. The healing agent 152 may be placed directly into the compartments 142 or may be placed within an encapsulating material (for example, an encapsulating material 174 described below and shown in FIG. 7B) within the compartments 142.

Figure 6:
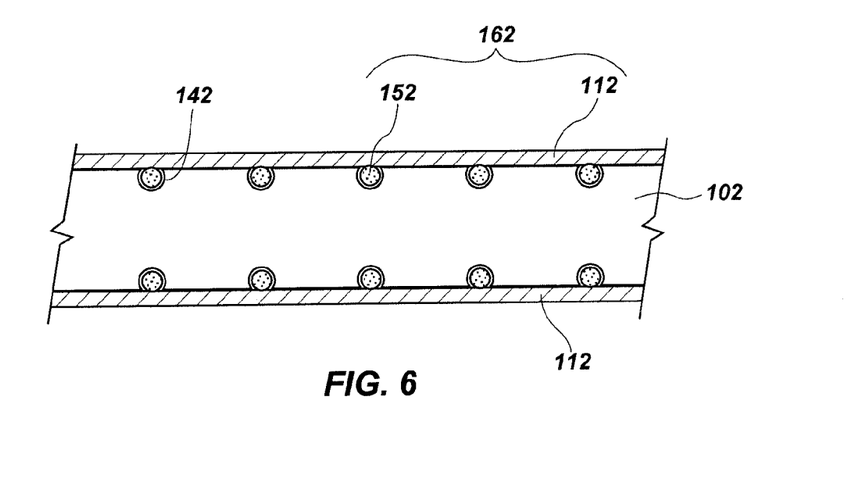

As shown in FIG. 6, a matrix material 112 may be disposed over the body 102 and the plurality of compartments 142, which may contain a healing agent 152. The matrix material 112 may comprise a protective coating as known in the art, such as a polymer, an epoxy, etc. In the configuration shown in FIG. 6, the matrix material 112 may form a protective coating of approximately uniform thickness over the body 102 and the compartments 142. Together, the matrix material 112 and the healing agent 152 in the plurality of compartments 142 may be referred to as a coating 162, and may perform in a matter similar to the coating 110 as shown and described in FIGS. 2 and 3. Dimensions of the compartments 142 may be less critical than the dimensions of the compartments 114 shown in FIG. 2 because the compartments 142 shown in FIG. 6 may be outside the edges of the matrix material 112 instead of residing in the matrix material 112. Therefore, the compartments 142 may have a dimension similar to the thickness of the matrix material 112 without negatively affecting physical properties of the coating 162. For example, the compartments 142 may have a dimension larger than the thickness of the matrix material 112, a dimension from about 50% to about 100% of the thickness of the matrix material 112, or a dimension of less than about 50% of the thickness of the matrix material 112. In some embodiments, a catalyst may be contained within some of the compartments 142, or may be disposed within the matrix material. When the coating 162 is damaged, the healing agent 152 may form a barrier over the body 102 and/or the coating 162.

Figure 7A:
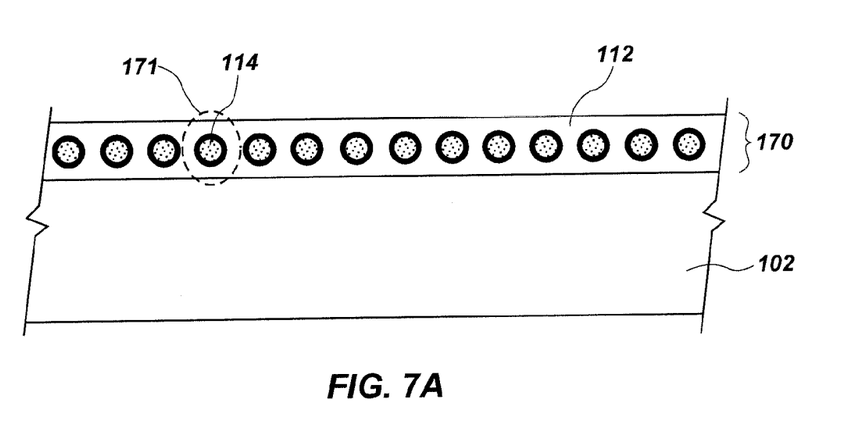
FIGS. 7A and 7B are cross-sectional views of another embodiment of a component of a wellbore tool including a coating.

FIG. 7A shows another embodiment of the disclosure. An ordered array of compartments 114 may be disposed within a matrix material 112 over a body 102. For example, the compartments 114 may be arranged in a layer over the body 102, with gaps between the compartments 114 filled by the matrix material 112. A compartment 114 within dashed line 171 is shown in more detail in FIG. 7B. The compartment 114 may include a healing agent 172 contained within an encapsulating material 174. The encapsulating material 174 may be a material selected for its ability to confine the healing agent 172 during application of a coating 170 and normal use, and for its ability to rupture and release the healing agent 172 when the coating 170 is damaged. The encapsulating material 174 may form a bond with the matrix material 112, such that damage to the coating 170 causes damage to the encapsulating material 174, rather than simply a break of the bond between the encapsulating material 174 and the matrix material 112 so that damage to the encapsulating material 174 is accompanied by the release of the healing agent 172, whereas mere breakage of the bond between the encapsulating material 174 and the matrix material 112 might occur without the release of the healing agent 172. Damage to the encapsulating material 174 may be caused, for example, by a selected pH or pH range, temperature increase, pressure increase, electrical signal, acoustic signal, or shear stress acting on the coating 170. A thickness of the encapsulating material 174 may be tailored to select the amount of damage required to cause the release of the healing agent 172. The thickness of the encapsulating material 174 may be selected to be thick enough to avoid rupture of the compartment 114 during application of the coating 170, yet thin enough that the compartment 114 will rupture at an appropriate time during use (e.g., when damage occurs to the coating 170 within a selected distance from the compartment 114). In some embodiments, an external signal may rupture the compartment 114. For example, an external electrical charge or an acoustic wave may be applied to the compartment 114. Such signals may damage the encapsulating material 174, such as by heating or vibrating.

Figure 7B:
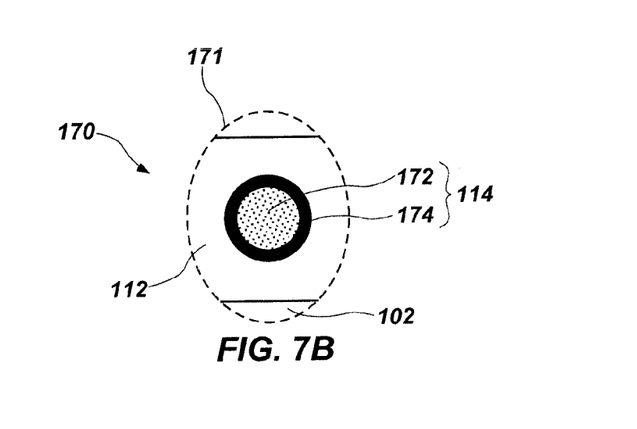

Compartments that include a healing agent 172 contained within an encapsulating material 174 may be disposed in random or ordered arrangements within the matrix material 112 or in or proximate the surface of the body 102 in accordance with embodiments of the disclosure.

Figure 8:
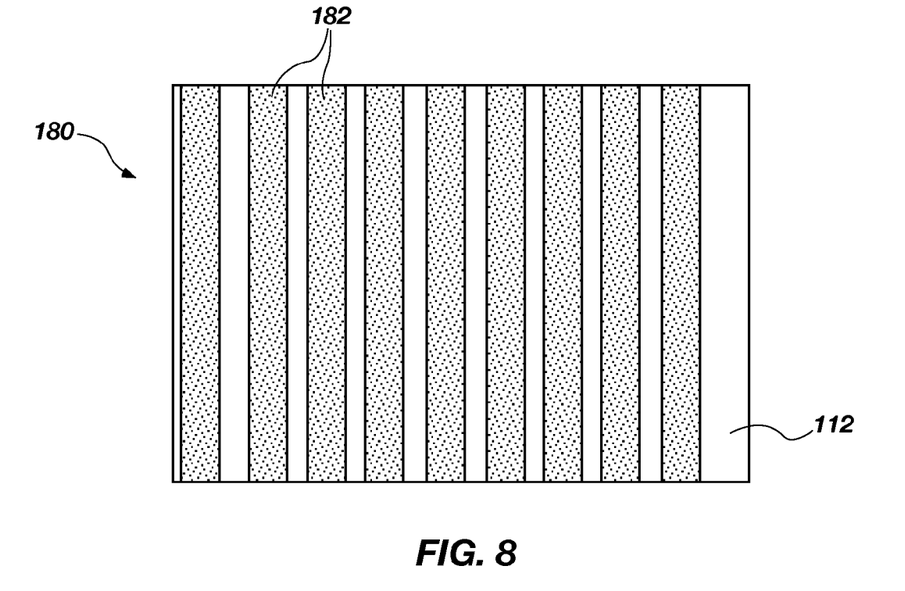
FIGS. 8 and 9 are views of coatings over a component of a wellbore tool.

Another embodiment of a coating material 180 is shown in plan view in FIG. 8. The coating material 180 includes a plurality of fibers 182. The plurality of fibers 182 may be configured as the compartments 114 described above, and may include healing agents therein. The plurality of fibers 182 may be arranged in a pattern over a body 102 (see FIG. 7A), such as in an array of fibers 182 approximately parallel and evenly spaced. In some embodiments, a single fiber 182 may be positioned over a body 102, such as in a continuous spiral wound over a cylindrical exterior of a tool body. A matrix material 112 may be disposed between, over, under, and/or around the fibers 182. The fibers 182 may be configured as the compartments 114 shown in FIGS. 7A and 7B to have a healing agent 172 contained within an encapsulating material 174.

Figure 9:
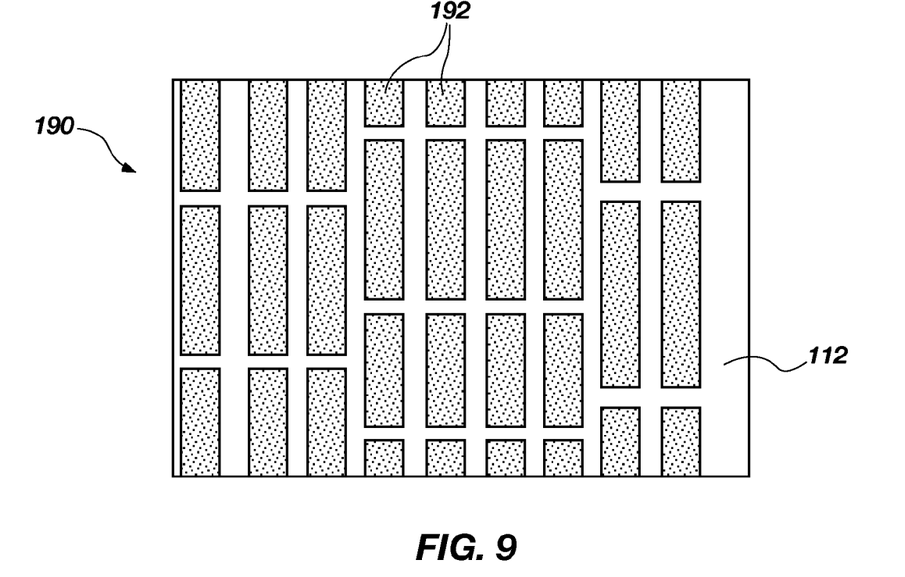

Another embodiment of a coating material 190 is shown in plan view in FIG. 9. The coating material 190 includes a plurality of compartments 192 configured as segments longitudinally and laterally separated and, optionally, partially longitudinally offset. The plurality of compartments 192 may be configured as the compartments 114 described above, and may include healing agents therein. The plurality of compartments 192 may be arranged in a pattern over a body 102 (see FIG. 7A), such as in an array of compartments 192 having sides approximately parallel and evenly spaced from one another.

Figure 10:
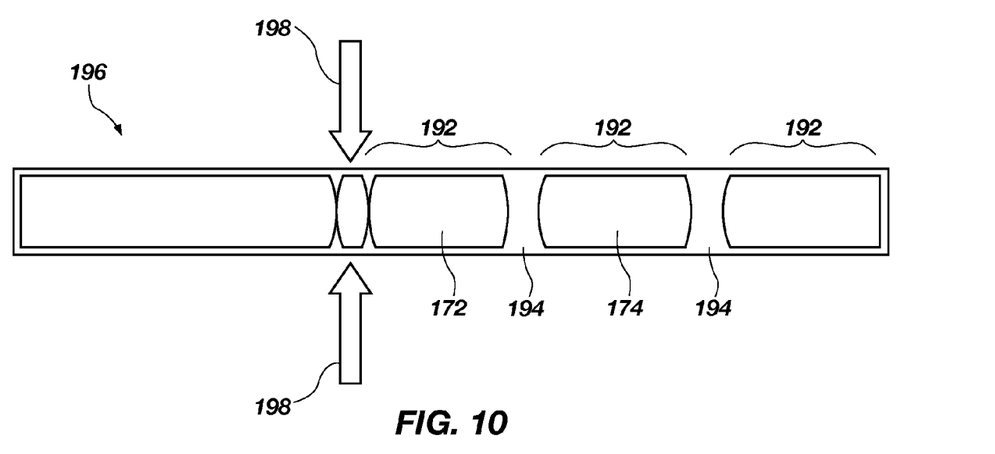
FIG. 10 is a cross-sectional view of a segmented fiber containing isolated portions of a healing agent to be used to form coatings of the present invention.

As shown in FIG. 10, a fiber 196 may include a plurality of compartments 192. The compartments 192 may be separated from one another by walls 194. Walls 194 may prevent the healing agent 172 within one compartment 192 from being released when the encapsulating material 174 of an adjacent compartment 192 is breached. That is, the walls 194 may limit the amount of healing agent 172 released upon damage to the coating material 190 (FIG. 9) to those areas affected by the damage. By retaining a portion of the healing agent 172 within undamaged portions of the coating material 190, the coating material 190 may retain its self-healing properties near those undamaged portions.

Wellbore tools and components thereof, such as those described above with reference to FIGS. 1 through 10, may be formed by forming a body 102 and forming or disposing a coating (e.g., coating 110, 162, 170, 180, or 190) over the body 102. Bodies 102 may be formed to have any selected, appropriate shape and size. Bodies 102 may be formed by any method known in the art, such as machining, casting, forging, sintering, etc., methods which are not described in detail herein.

Coatings may be formed by various methods. For example, as shown in FIG. 2, a coating 110 may be formed over a body 102 by mixing a plurality of compartments 114 with a matrix material 112. The matrix material 112 and compartments 114 may be applied over the body 102 and cured to fount a solid coating 110. The matrix material 112 and compartments 114 may be applied by dipping, spray-on, or spin-on techniques, or by any other technique known in the art. As described above, the compartments 114 may contain a healing material. A catalyst may, optionally, be added to the matrix material 112 and/or within some of the compartments 114. The catalyst may be physically separated from the healing agent until the coating 110 is damaged.

In some embodiments, such as shown in FIGS. 4 through 6, a plurality of compartments 142 may be formed in-situ within the body 102. The compartments 142 may be formed through a surface 109 by any method known in the art, such as powder blasting, chemical etching through a mask material, laser ablation, etc. After formation, the compartments 142 may be filled with the healing agent 152. For example, the body 102 may be dipped into a bath of the healing agent 152, and upon removal from the bath, portions of the healing agent 152 may remain within the compartments 142 due to capillary action. The healing agent 152 may alternatively be poured over the body 102 and into the compartments 142, or may be applied to the compartments 142 by microsyringe. The matrix material 112 may then be applied over the healing agent 152, sealing the healing agent 152 within the compartments 142 and separating the compartments 142 from one another. The matrix material 112 may be cured and/or solidified by methods known in the art.

Another healing agent, such as a catalyst, may optionally be added to the matrix material 112 such that, when the matrix material 112 is damaged and some of the compartments 142 are exposed, the healing agent 152 may react with the another healing agent. In some embodiments, a material may be applied over the surface 109 of the body 102 and over the healing agent 152 to provide a barrier layer to prevent the healing agent 152 from contacting a catalyst within the matrix material 112 until the coating 110 is sufficiently damaged. For example, a membrane or a layer of matrix material 112 without a catalyst may be applied before the matrix material 112 including a catalyst is applied over the surface 109 and the healing agent 152.

As shown in FIGS. 2, 6, and 7A, the matrix material 112 may be applied between, over, under, and/or around the compartments 114.

The compartments 114 may be formed by various methods. For example, as shown in FIG. 7B, compartments 114 may be formed of a healing agent 172 within an encapsulating material 174. The compartments 114 may be formed as spheres, capsules, fibers, platelets, rods, irregular objects, or any other shape appropriate for the application. The compartments 114 may be formed by methods known in the art, which will not be explained in detail herein, such as by physical methods (e.g., extrusion, fluidized bed reaction, pan coating, atomization, etc.) or chemical methods (e.g., solvent loss, phase separation, coacervation, polymerization, precipitation, nanoencapsulation, liposome processing, sol-gel reaction, etc.). For example, compartments 114 containing the healing agent 172 may be formed by coaxial electrospinning, which may include providing two viscous liquids simultaneously through inner and outer capillaries, and applying a voltage to the outer capillary. Such a process is described in Jeong-Ho Park and Paul V. Brown, *Coaxial Electrospinning of Self-Healing Coatings,* 22 ADVANCED MATERIALS 496 (2010), the disclosure of which is incorporated herein in its entirety by this reference. The encapsulating material 174 may be a material selected for its adhesive properties, such as for its ability to form a bond with a matrix material. The encapsulating material 174 may be a polymer, epoxy, wax, etc. For example, the encapsulating material 174 may be a polyurethane, a polyvinyl, etc., such as poly(vinylpyrrolidone) (PVP) or butylcyanoacrylate.

If the healing agent 172 is a fluid, the compartments 114 may be formed by first forming an encapsulating material 174 comprising a polymer shell, such as by techniques used for biomedical applications. The polymer shell may then be coated with a metallic film, for example, by chemical vapor deposition (CVD), atomic layer deposition (ALD), electroless plating, or other suitable techniques, to make it compatible with the matrix material 112.

An adhesion promoter may be added to the encapsulating material 174 and/or the matrix material 112 to increase adhesion between the encapsulating material 174 and the matrix material 112. An adhesion promoter may tend to prevent the compartments 114 from dissociating from the matrix material 112 in response to damage to the coating 110, instead of rupturing in response to stress from the damage. For example, an adhesion promoter may include methylacryloxy propyl thiethoxy silane or (3-trimethyloxysilylpropyl) dimethylene triamine.

In some embodiments, the compartments 114 may not include an encapsulating material 174. The healing agent 172 may instead be phase-separated from the matrix material 112, such as due to insolubility of the healing agent 172 with the matrix material 112.

In some embodiments, as shown in FIG. 10, volumes of healing agent 172 may be divided among compartments 192, which may also be characterized as cells, within a fiber 196. The fiber 196 may be formed to have an encapsulating material 174 around the healing agent 172. For example, the encapsulating material 174 and the healing agent 172 may be coextruded through coaxial capillaries. The compartments 192 may be created by forming walls 194 within a fiber having an encapsulating material 174 around the healing agent 172. The walls 194 may be formed by, for example, exposing a portion of the fiber 196 to focused radiation 198 (e.g., UV radiation, laser radiation, etc.). The healing agent 172 within the encapsulating material 174 may then cure in the area subjected to the radiation 198. Successive walls 194 may be formed to separate the fiber 196 into compartments 192.

Methods of utilizing a wellbore tool in a subterranean formation may include providing a wellbore tool having a body and a coating formed over the body. The body may be any body 102 as described above, and may have a coating over at least a portion thereof (e.g., coating 110, 162, 170, 180, or 190). The coating may include one or more healing agents, such as within capsules or other compartments. The compartments may be configured to release the healing agent or agents upon damage to the coating. A fluid (e.g., drilling mud, cooling fluid, etc.) may be provided to at least a portion of the body, and may include another healing agent (e.g., a catalyst). The healing agent provided with the fluid may react with a healing agent released near the site of damage to a surface of a body 102. The fluid may flow through a drill string or a surrounding wellbore annulus to contact portions of the wellbore tool at risk of damage.

The composition of the fluid may be varied during a downhole operation. For example, under normal operations, a drilling fluid or a formation treatment fluid may not contain a healing agent. When damage to a portion of a wellbore tool is suspected or anticipated, a healing agent may be introduced to promote the healing of damaged surfaces. In some embodiments, a healing agent may be in the fluid under normal operations, to promote rapid healing of surfaces as soon as damage occurs. The healing agent in the fluid may be selected to react with at least one of the coating or material of the body, such as with a healing agent contained within the coating. The concentration and/or type of healing agent within the fluid may be varied during a drilling operation, and may depend on the specific type of body, coating, type and extent of expected or measured damage, drilling conditions, etc.

Additional non-limiting example embodiments of the disclosure are described below.

Embodiment 1

A component of a wellbore tool comprising a body, a plurality of compartments disposed over a surface of the body, and a coating disposed over at least a portion of the body. Each compartment comprises a healing agent formulated to form or catalyze the formation of a barrier over a portion of the wellbore tool upon release from the compartment. The coating comprises a matrix material separating the plurality of compartments from one another.

Embodiment 2

The component of a wellbore tool of Embodiment 1, wherein each compartment of the plurality is configured to release the healing agent therefrom in response to damage located within at least a selected distance from the compartment without releasing the healing agent in response to damage located beyond the selected distance.

Embodiment 3

The component of a wellbore tool of Embodiment 1 or Embodiment 2, further comprising another healing agent comprising a catalyst formulated to increase a cure rate of the healing agent responsive to contact with the healing agent.

Embodiment 4

The component of a wellbore tool of any of Embodiments 1 through 3, wherein each compartment of the plurality is configured to rupture and release the healing agent therein in response to exposure to at least one of a selected pH, a selected pH range, an elevated temperature, an elevated pressure, impact, shear stress, an electronic signal, and an acoustic signal.

Embodiment 5

The component of a wellbore tool of any of Embodiments 1 through 4, wherein the healing agent is formulated to improve at least one of corrosion resistance of a material of the surface of the body and a coefficient of friction of the surface of the body.

Embodiment 6

The component of a wellbore tool of any of Embodiments 1 through 5, wherein each compartment of the plurality has at least one dimension of about 1 micron or smaller.

Embodiment 7

The component of a wellbore tool of any of Embodiments 1 through 6, wherein the healing agent comprises a liquid formulated to form a solid barrier over an adjacent portion of the wellbore tool upon release from the compartment.

Embodiment 8

The component of a wellbore tool of any of Embodiments 1 through 7, wherein a first compartment of the plurality of compartments comprises a first healing agent, and a second compartment of the plurality of compartments comprises a second healing agent having a composition differing from a composition of the first healing agent.

Embodiment 9

The component of a wellbore tool of any of Embodiments 1 through 8, wherein at least one of the first healing agent and the second healing agent comprises a catalyst for catalyzing a reaction for forming the barrier over an adjacent portion of the wellbore tool.

Embodiment 10

The component of a wellbore tool of claim 1, wherein the healing agent comprises a material formulated to promote self-passivation of the body.

Embodiment 11

The component of a wellbore tool of claim 1, wherein the healing agent comprises an inhibitor.

Embodiment 12

The component of a wellbore tool of claim 1, wherein the healing agent comprises a material formulated to reduce a reactivity of a material surrounding the wellbore tool in use with at least one of the coating and the body.

Embodiment 13

A method of forming a wellbore tool, comprising forming a body, forming a plurality of capsules, and forming a coating comprising the capsules over at least a portion of a surface of the body. Each capsule comprises a healing agent formulated to form a barrier over the wellbore tool upon release from the capsule. The coating comprises a matrix material configured to maintain separation between capsules of the plurality of capsules.

Embodiment 14

The method of Embodiment 13, wherein forming the plurality of capsules comprises forming a fiber comprising a healing agent surrounded by an encapsulating material and segmenting the fiber to form capsules. The healing agent of each capsule of the plurality is separated from the healing agent of adjacent capsules by a barrier within the fiber.

Embodiment 15

The method of Embodiment 13 or Embodiment 14, further comprising forming a plurality of fibers comprising a healing agent surrounded by an encapsulating material, arranging the plurality of fibers to cover at least a portion of a surface of the body, and disposing the matrix material at least partially adjacent each fiber of the plurality of fibers.

Embodiment 16

The method of any of Embodiments 13 through 15, wherein forming the plurality of capsules comprises forming the plurality of capsules to have at least one average dimension of about 1 micron or smaller.

Embodiment 17

The method of any of Embodiments 13 through 16, wherein forming the coating over at least a portion of the body comprises forming the coating to comprise a catalyst formulated to increase a cure rate of the healing agent.

Embodiment 18

The method of Embodiment 17, wherein forming the coating to comprise a catalyst formulated to increase a cure rate of the healing agent comprises forming another plurality of capsules comprising the catalyst.

Embodiment 19

A method of utilizing a wellbore tool in a subterranean formation comprising disposing a wellbore tool in a borehole. The wellbore tool comprises a body and a coating over at least a portion of the body, the coating comprising a matrix material and a plurality of capsules, each capsule comprising a first healing agent. The method may further include contacting at least a portion of the body with a fluid comprising a second healing agent formulated to form a barrier over at least a portion of the wellbore tool upon contact with the first healing agent.

Embodiment 20

The method of Embodiment 19, further comprising adjusting a composition of the fluid to change at least one of a concentration and an identity of the second healing agent.

Embodiment 21

A coating for a wellbore tool, comprising a fiber comprising a plurality of discrete cells and a matrix material contacting and at least partially surrounding the fiber. Each cell comprises a healing agent, and the healing agent is formulated to form a barrier upon release from the fiber.

Embodiment 22

The coating of Embodiment 21, wherein the cells are separated by walls of solid material formed by subjecting a portion of the healing agent to UV irradiation.

Embodiment 23

The coating of Embodiment 21 or Embodiment 22, wherein the fiber further comprises an encapsulating material at least substantially surrounding the healing agent, the encapsulating material configured to retain the healing agent until the coating is damaged and to release at least a portion of the healing agent when the coating is damaged.

Although the foregoing description contains many specifics, these are not to be construed as limiting the scope of the present invention, but merely as providing certain embodiments. Similarly, other embodiments of the invention may be devised that do not depart from the scope of the present invention. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A component of a wellbore tool, comprising:
   a body; and
   a coating disposed over at least a portion of the body, the coating comprising a matrix material and at least one fiber having a length of at least about 1 mm and a diameter of less than about 100 microns, the at least one fiber disposed within the matrix material and comprising an encapsulating material defining a plurality of compartments separated from adjacent compartments by the encapsulating material, wherein each compartment contains a healing agent formulated to form a barrier or catalyze the formation of a barrier over an adjacent portion of the wellbore tool upon release of the healing agent from the compartment.

2. The component of a wellbore tool of claim 1, wherein each compartment of the plurality is configured to release the healing agent therefrom in response to damage located within at least a selected distance from the compartment without releasing the healing agent in response to damage located beyond the selected distance.

3. The component of a wellbore tool of claim 1, wherein the coating further comprises another healing agent comprising a catalyst formulated to increase a cure rate of the healing agent responsive to contact with the healing agent.

4. The component of a wellbore tool of claim 1, wherein each compartment of the plurality is configured to rupture and release the healing agent therein in response to exposure to at least one of a selected pH, a selected pH range, an elevated temperature, an elevated pressure, impact, shear stress, an electronic signal, and an acoustic signal.

5. The component of a wellbore tool of claim 1, wherein the healing agent is formulated to improve a property of the wellbore tool, wherein improving the property comprises at least one of increasing a corrosion resistance of a material of the surface of the body and decreasing a coefficient of friction of the surface of the body.

6. The component of a wellbore tool of claim 1, wherein each compartment of the plurality has at least one dimension of 1 micron or smaller.

7. The component of a wellbore tool of claim 1, wherein the healing agent comprises a liquid formulated to form a solid barrier over an adjacent portion of the wellbore tool upon release from the compartment.

8. The component of a wellbore tool of claim 1, wherein a first compartment of the plurality of compartments comprises a first healing agent, and a second compartment of the plurality of compartments comprises a second healing agent having a composition differing from a composition of the first healing agent.

9. The component of a wellbore tool of claim 8, wherein at least one of the first healing agent and the second healing agent comprises a catalyst for catalyzing a reaction for forming the barrier over an adjacent portion of the wellbore tool.

10. The component of a wellbore tool of claim 1, wherein the healing agent comprises a material formulated to promote self-passivation of the body.

11. The component of a wellbore tool of claim 1, wherein the healing agent comprises an inhibitor.

12. The component of a wellbore tool of claim 1, wherein the healing agent comprises a material formulated to reduce a reactivity of a material surrounding the wellbore tool with at least one of the coating and the body.

13. The component of a wellbore tool of claim 1, wherein the at least one fiber defines a plurality of compartments within the at least one fiber.

14. The component of a wellbore tool of claim 1, wherein at least one fiber comprises a plurality of fibers arranged in a pattern over the body.

15. The component of a wellbore tool of claim 1, wherein the body comprises a cylindrical exterior, and wherein the at least one fiber is spiral wound around the body.

16. A method of forming a component of a wellbore tool, comprising:
   forming a body;
   forming a coating over at least a portion of the body, the coating comprising a matrix material and at least one fiber having a length of at least about 1 mm and a diameter of less than about 100 microns, the at least one fiber disposed within the matrix material and comprising an encapsulating material defining a plurality of compartments separated from adjacent compartments by the encapsulating material, each compartment containing a healing agent formulated to form a barrier or catalyze the formation of a barrier over at least an adjacent portion of the body of the wellbore tool upon release of the healing agent from the compartment.

17. The method of claim 16, wherein forming the coating comprises:
   segmenting the at least one fiber to form at least some of the compartments, wherein the healing agent of each compartment of the plurality within the at least one fiber is separated from the healing agent of adjacent compartments by a barrier within the at least one fiber.

18. The method of claim 16, wherein forming the coating comprises:
   forming a plurality of fibers comprising a healing agent surrounded by an encapsulating material;
   arranging the plurality of fibers to cover at least a portion of a surface of the body; and
   disposing the matrix material at least partially adjacent each fiber of the plurality of fibers.

19. The method of claim 16, wherein forming the coating comprises forming the plurality of compartments to have at least one average dimension of 1 micron or smaller.

20. The method of claim 16, wherein forming the coating comprises forming the coating to comprise a catalyst formulated to increase a cure rate of the healing agent.

21. The method of claim 20, wherein forming the coating to comprise a catalyst formulated to increase a cure rate of the healing agent comprises forming another plurality of compartments comprising the catalyst.

22. A method of utilizing a wellbore tool in a subterranean formation, the method comprising:
   disposing a wellbore tool comprising a body and a coating disposed over at least a portion of the body in a borehole, the coating comprising a matrix material and at least one fiber having a length of at least about 1 mm and a diameter of less than about 100 microns, the at least one fiber disposed within the matrix material and comprising an encapsulating material defining a plurality of compartments separated from adjacent compartments by the encapsulating material, each compartment containing a first healing agent formulated to form a barrier or catalyze the formation of a barrier over an adjacent portion of the wellbore tool upon release of the healing agent from the compartment; and contacting at least a portion of the body with a fluid, the fluid comprising a second healing agent formulated to form or catalyze the formation of a barrier over at least a portion of the wellbore tool upon contact with the first healing agent.

23. The method of claim 22, further comprising adjusting a composition of the fluid to change at least one of a concentration and an identity of the second healing agent.

* * * * *